(12) United States Patent
Park

(10) Patent No.: US 10,696,036 B2
(45) Date of Patent: Jun. 30, 2020

(54) APPARATUS AND METHOD OF FABRICATING THREE-DIMENSIONAL OBJECT

(71) Applicant: Soyoung Park, Kanagawa (JP)

(72) Inventor: Soyoung Park, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 523 days.

(21) Appl. No.: 15/443,577

(22) Filed: Feb. 27, 2017

(65) Prior Publication Data

US 2017/0252975 A1 Sep. 7, 2017

(30) Foreign Application Priority Data

Mar. 1, 2016 (JP) ................................. 2016-039374
Dec. 27, 2016 (JP) ................................. 2016-252485

(51) Int. Cl.
| | | |
|---|---|---|
| *B33Y 30/00* | (2015.01) | |
| *B29C 64/357* | (2017.01) | |
| *B33Y 10/00* | (2015.01) | |
| *B33Y 40/00* | (2020.01) | |
| *B29C 64/165* | (2017.01) | |

(52) U.S. Cl.
CPC ............ *B33Y 30/00* (2014.12); *B29C 64/357* (2017.08); *B33Y 10/00* (2014.12); *B33Y 40/00* (2014.12); *B29C 64/165* (2017.08)

(58) Field of Classification Search
CPC ......... B33Y 30/00; B33Y 10/00; B33Y 40/00; B29C 64/165; B29C 64/357; B29C 64/153; B29C 64/141; B29C 64/214; B29C 64/218
See application file for complete search history.

(56) References Cited

U.S. PATENT DOCUMENTS

| | | | | |
|---|---|---|---|---|
| 6,007,318 A | * | 12/1999 | Russell | .................. B29C 41/12 425/130 |
| 9,855,706 B2 | * | 1/2018 | Din | ......................... B22F 3/03 |
| 2003/0059492 A1 | * | 3/2003 | Gaillard | ................. B05C 11/02 425/258 |

(Continued)

FOREIGN PATENT DOCUMENTS

| | | |
|---|---|---|
| JP | 2001-038812 | 2/2001 |
| JP | 3551838 B2 * | 8/2004 |

(Continued)

OTHER PUBLICATIONS

Machine translation of JP-3551838-B2 (Year: 2004).*

(Continued)

*Primary Examiner* — Leith S Shafi
(74) *Attorney, Agent, or Firm* — Duft & Bornsen, PC

(57) ABSTRACT

A three-dimensional fabricating apparatus includes a fabrication chamber, a flattening member, a surplus powder chamber, and an impact applicator. The fabrication chamber stacks powder in layers and a layered fabrication object in which the powder is bonded together. The flattening member relatively moves with respect to the fabrication chamber to fill the fabrication chamber with the powder. The surplus powder chamber is disposed outside the fabrication chamber, to receive a surplus of the powder having not been filled in the fabrication chamber. The impact applicator is movable with the flattening member to contact and impact on the surplus powder chamber.

10 Claims, 16 Drawing Sheets

(56) References Cited

U.S. PATENT DOCUMENTS

| | | | |
|---|---|---|---|
| 2014/0306373 A1* | 10/2014 | Scheeres | B29B 17/0047 |
| | | | 264/238 |
| 2015/0258733 A1* | 9/2015 | Okamoto | B33Y 10/00 |
| | | | 428/413 |
| 2015/0343533 A1 | 12/2015 | Park et al. | |
| 2016/0067929 A1 | 3/2016 | Park | |
| 2016/0075085 A1 | 3/2016 | Sasaki | |
| 2016/0214320 A1 | 7/2016 | Sasaki et al. | |
| 2016/0243765 A1 | 8/2016 | Sasaki et al. | |
| 2016/0243805 A1 | 8/2016 | Satoh | |
| 2016/0361874 A1 | 12/2016 | Park et al. | |
| 2016/0368214 A1 | 12/2016 | Sasaki et al. | |

FOREIGN PATENT DOCUMENTS

| | | |
|---|---|---|
| JP | WO2007/013240 A1 | 2/2007 |
| JP | 2008-302701 | 12/2008 |
| JP | 2013-067116 | 4/2013 |
| JP | 2013-075389 | 4/2013 |
| JP | 2017-001381 | 1/2017 |

OTHER PUBLICATIONS

U.S. Appl. No. 15/276,881, filed Sep. 27, 2016, US 2017/0095979 A1.
U.S. Appl. No. 15/299,788, filed Oct. 21, 2016, US 2017/0120521 A1.

* cited by examiner

APPARATUS AND METHOD OF FABRICATING THREE-DIMENSIONAL OBJECT

CROSS-REFERENCE TO RELATED APPLICATION

This patent application is based on and claims priority pursuant to 35 U.S.C. § 119(a) to Japanese Patent Application Nos. 2016-039374 filed on Mar. 1, 2016 and 2016-252485 filed on Dec. 27, 2016 in the Japan Patent Office, the entire disclosure of each of which is hereby incorporated by reference herein.

BACKGROUND

Technical Field

Aspects of the present disclosure relate to an apparatus and a method of fabricating a three-dimensional object.

Related Art

A solid (three-dimensional) fabricating apparatus uses, for example, a lamination fabrication method to fabricate a solid (three-dimensional) object. For the lamination fabrication method, for example, a flattened metal or non-metal powder is formed in a shape of layer on a fabrication stage, and fabrication liquid is discharged from a head to a layered powder (referred to as "powder layer") on the fabrication stage to form a layered fabrication object (referred to as "fabrication layer") in which powder particles are bonded together. A step of forming another powder layer on the fabrication layer to reform the fabrication layer is repeated to laminate the fabrication layers one on another, thus fabricating a three-dimensional object.

In the formation of a powder layer, unused powder (referred to as surplus powder) of the powder supplied occurs which is not or has not been used to form the powder layer.

Hence, a surplus powder chamber may be disposed to collect surplus powder.

SUMMARY

In an aspect of the present disclosure, there is provided a three-dimensional fabricating apparatus that includes a fabrication chamber, a flattening member, a surplus powder chamber, and an impact applicator. The fabrication chamber stacks powder in layers and a layered fabrication object in which the powder is bonded together. The flattening member relatively moves with respect to the fabrication chamber to fill the fabrication chamber with the powder. The surplus powder chamber is disposed outside the fabrication chamber, to receive a surplus of the powder having not been filled in the fabrication chamber. The impact applicator is movable with the flattening member to contact and impact on the surplus powder chamber.

In another aspect of the present disclosure, there is provided a method of fabricating a three-dimensional object that includes filling, with powder, a fabrication chamber in which a layered fabrication object including the powder bonded together is to be stacked; falling a surplus of the powder, which has not been filled in the fabrication chamber by the filling, into a surplus powder chamber outside the fabrication chamber; impacting on the surplus powder chamber; and applying a fabrication liquid to the powder to form a fabrication layer.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

Figure 1:
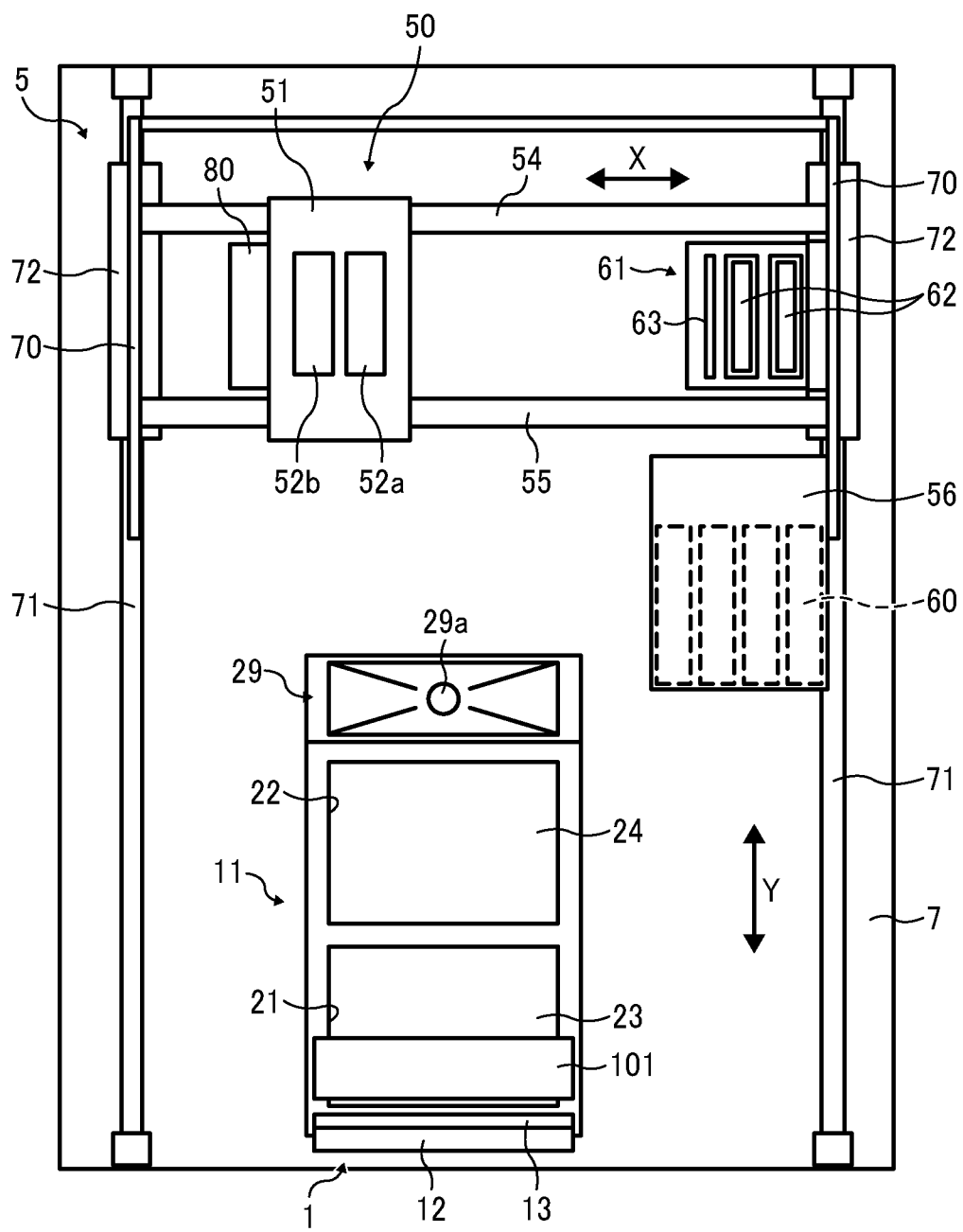
FIG. 1 is a schematic plan view of an example of a three-dimensional fabricating apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity.

However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Figure 2:
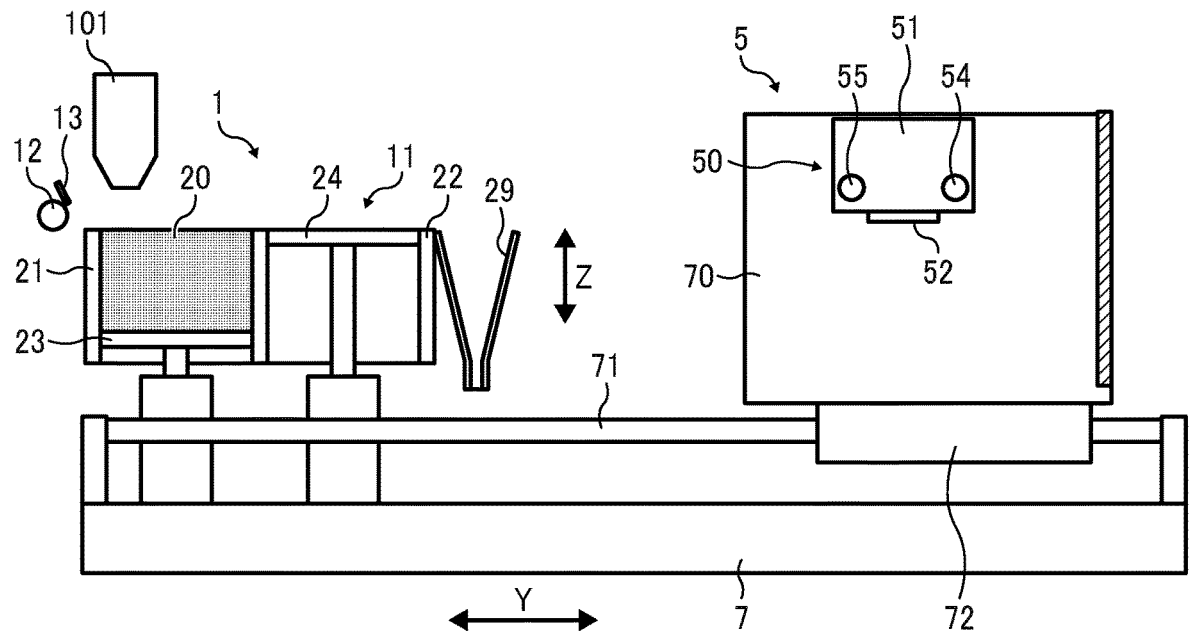
FIG. 2 is a side view of the three-dimensional fabricating apparatus of FIG. 1.
Figure 3:
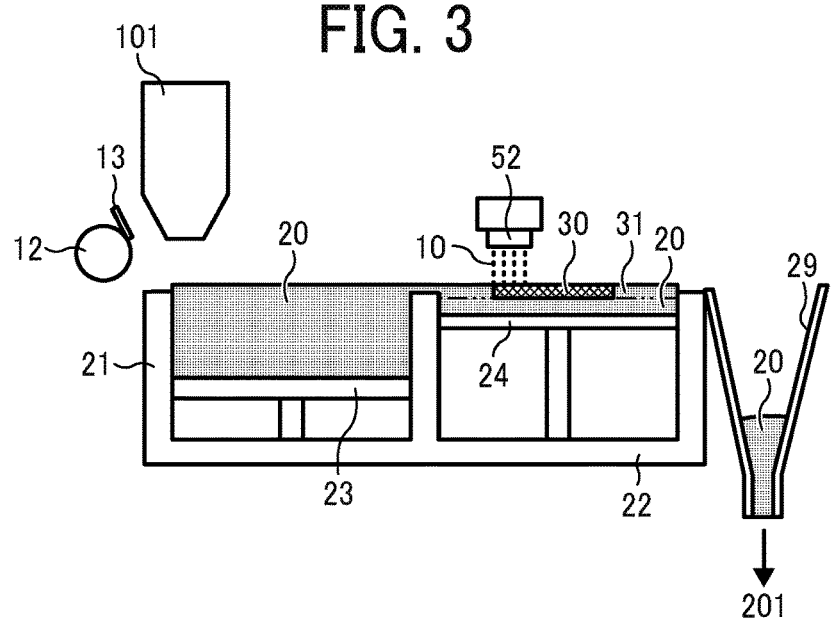
FIG. 3 is a cross-sectional view of a fabrication section of the three-dimensional fabricating apparatus of FIG. 1.

Referring now to the drawings, wherein like reference numerals designate identical or corresponding parts throughout the several views, embodiments of the present disclosure are described below. First, a three-dimensional fabricating apparatus according to an embodiment of this disclosure is described with reference to FIGS. 1 through 3. FIG. 1 is a plan view of the three-dimensional fabricating apparatus according to an embodiment of the present disclosure. FIG. 2 is a side view of the three-dimensional fabricating apparatus of FIG. 1. FIG. 3 is a cross-sectional view of a fabrication section of the three-dimensional fabricating apparatus of FIG. 1. In FIG. 3, a state of the fabricating section during fabrication is illustrated.

A three-dimensional fabricating apparatus 601 according to the present embodiment is a powder fabricating apparatus (also referred to as a powder fabricating apparatus). The three-dimensional fabricating apparatus 601 includes a fabrication section 1 and a fabrication unit 5. The fabrication section 1 forms a fabrication layer 30 that is a layered fabrication object in which powders are bonded together. The fabrication unit 5 fabricates the fabrication layer 30 by discharging fabrication liquid 10 onto a powder layer 31 that is overlaid in layers in the fabrication section 1.

The fabrication section 1 includes a powder chamber 11 and a flattening roller 12 as a rotator that is a flattening member (recoater). Note that the flattening member may be, for example, a plate member (blade) instead of the rotator.

The powder chamber 11 includes a supply chamber 21, a fabrication chamber 22, and a surplus powder chamber 29. The supply chamber 21 retains the powder 20 to be supplied to the fabrication chamber 22. In the fabrication chamber 22, fabrication layers 30 are laminated one on another to fabricate an object. The surplus powder chamber 29 stores a surplus of the powder 20, which falls without forming the powder layer 31, of the powder 20 transferred and supplied by the flattening roller 12 to form the powder layer 31.

A bottom portion of the supply chamber 21 acts as a supply stage 23 and is movable upward and downward in a vertical direction (height direction). Similarly, a bottom portion of the fabrication chamber 22 also acts as a fabrication stage 24 and is movable upward and downward in the vertical direction (height direction). A three-dimensional object in which the fabrication layers 30 are laminated is fabricated on the fabrication stage 24. The surplus powder chamber 29 may have a configuration including a mechanism to attract the powder 20 to a bottom of the surplus powder chamber 29 or a configuration in which the fabrication chamber 22 is removable in simple manner.

A motor 27 moves the supply stage 23 upward and downward along a direction (height direction) indicated by arrow Z in FIG. 2. Likewise, a motor 28 moves the fabrication stage 24 upward and downward along the direction indicated by arrow Z.

The flattening roller 12 transfers and supplies the powder 20, which has been supplied on the supply stage 23 of the supply chamber 21, to the fabrication chamber 22 and evens and flattens the surface of a layer of the powder 20, which has been supplied with the flattening roller 12 as the flattening unit, to form the powder layer 31.

The flattening roller 12 is disposed to be relatively reciprocally movable with respect to a stage surface (a surface on which powder 20 is stacked) of the fabrication stage 24 along a direction indicated by arrow Y in FIG. 2, which is a direction along the stage surface of the fabrication stage 24. The flattening roller 12 is moved by a reciprocal moving assembly. The flattening roller 12 is driven to rotate by a motor 26.

The fabrication unit 5 includes a liquid discharge unit 50 to discharge fabrication liquid 10 to the powder layer 31 on the fabrication stage 24.

The liquid discharge unit 50 includes a carriage 51 and two liquid discharge heads (hereinafter referred to as simply "head(s)") 52a and 52b mounted on the carriage 51. In FIG. 1, two liquid discharge heads are illustrated. However, in some embodiments, the number of liquid discharge heads is one, or three or more.

The carriage 51 is movably held with a guide 54 and a guide 55. The guide 54 and the guide 55 are held with lateral side plates 70 to be movable upward and downward.

Via a pulley and a belt, an X-direction scanning motor constituting an X-direction scanning assembly 550 reciprocally moves the carriage 51 along the direction indicated by arrow X that is a main scanning direction. Note that, hereinafter, the direction indicated by arrow X is simply referred to as "X direction", and the same applies to "Y direction" and "Z direction".

Each of the two heads 52a and 52b (hereinafter, referred to as "heads 52" unless distinguished) includes two nozzle rows, each including a plurality of nozzles arrayed to discharge fabrication liquid. Two nozzle rows of one head 52a discharge, for example, cyan fabrication liquid and magenta fabrication liquid. Two nozzle rows of the other head 52a discharge, for example, yellow fabrication liquid and black fabrication liquid. Note that the configuration of the liquid discharge heads is not limited to the above-described configuration. In some embodiments, for example, a colorless fabrication liquid including no colorants may be used.

A tank mount 56 mounts a plurality of tanks 60 containing cyan fabrication liquid, magenta fabrication liquid, yellow fabrication liquid, and black fabrication liquid. The fabrication liquids are supplied to the heads 52a and 52b through, e.g., supply tubes.

Further, a maintenance assembly 61 to maintain and recover the heads 52 of the liquid discharge unit 50 in good condition is disposed at one end in the X direction.

The maintenance assembly 61 includes caps 62 and a wiper 63. The caps 62 are brought into close contact with nozzle faces (nozzle formed faces) of the heads 52, and fabrication liquid is sucked from nozzles. Thus, powder clogged at the nozzles and thickened fabrication liquid are discharged. Then, the wiper 63 wipes the nozzle faces to form menisci in the nozzles (with the interiors of the nozzles being in negative pressure state). When fabrication liquid is not discharged, the maintenance assembly 61 covers the nozzle faces of the heads 52 with the caps 62 to prevent incorporation of powder 20 into nozzles and drying of the fabrication liquid 10.

The fabrication unit 5 includes a slider portion 72 slidably supported on a guide 71 above a base 7. The entire fabrication unit 5 is reciprocally movable in the Y direction perpendicular to the X direction. The entire fabrication unit 5 is reciprocally moved along the Y direction by the Y-direction scanning assembly 552.

The liquid discharge unit 50 is disposed to be movable upward and downward along the Z direction together with the guides 54 and 55. A Z-direction elevation assembly 551 moves the liquid discharge unit 50 upward and downward along the Z direction.

In the following, the fabrication section 1 is further described.

The powder chamber 11 has a box shape and includes three chambers, the supply chamber 21, the fabrication chamber 22, and the surplus powder chamber 29, each of which is open at the upper side thereof. The supply stage 23 and the fabrication stage 24 are arranged inside the supply chamber 21 and the fabrication chamber 22, respectively, so as to be movable upward and downward.

Lateral faces of the supply stage 23 are disposed to contact inner lateral faces of the supply chamber 21. Lateral faces of the fabrication stage 24 are disposed to contact inner lateral faces of the fabrication chamber 22. The upper faces of the supply stage 23 and the fabrication stage 24 are held horizontally.

The surplus powder chamber 29 is disposed adjacent to the fabrication chamber 22, to receive surplus powder discharged to the outside of the fabrication chamber 22. The surplus powder chamber 29 has a funnel shape and has a discharge port 29a at a bottom of the surplus powder chamber 29.

A surplus of the powder 20 transferred and supplied with the flattening roller 12 in formation of a powder layer 31 falls to the surplus powder chamber 29. The surplus of the powder 20 having fallen to the surplus powder chamber 29 is returned, via a collection recycler 201 being a powder collection recycling device, to a powder supplier 101 that supplies powder to the supply chamber 21.

The powder supplier 101 is disposed above the supply chamber 21. In an initializing operation of fabrication or when the amount of powder in the supply chamber 21 decreases, powder in a tank constituting the powder supplier 101 is supplied to the supply chamber 21. Examples of a powder transporting method for supplying powder include a screw conveyor method utilizing a screw and an air transport method utilizing air.

The flattening roller 12 transfers and supplies powder 20 from the supply chamber 21 to the fabrication chamber 22 and smooths and flattens the surface of the powder 20 to form a powder layer 31 as a layered powder having a desired thickness.

The flattening roller 12 is a bar longer than an inside dimension of the fabrication chamber 22 and the supply chamber 21 (that is, a width of a portion to which powder is supplied or stored). The reciprocal moving assembly reciprocally moves the flattening roller 12 in the Y direction (a sub-scanning direction) along the stage surface.

The flattening roller 12, while being rotated by the motor 26, horizontally moves to pass an area above the supply chamber 21 and the fabrication chamber 22 from the outside of the supply chamber 21. Accordingly, the powder 20 is transferred and supplied onto the fabrication chamber 22, and the flattening roller 12 flattens the powder 20 while passing over the fabrication chamber 22, thus forming the powder layer 31.

As illustrated in FIG. 2, a powder removal plate 13 serving as a powder remover to remove the powder 20 attached to the flattening roller 12 is disposed in contact with a circumferential surface of the flattening roller 12.

The powder removal plate 13 moves together with the flattening roller 12 in contact with the circumferential surface of the flattening roller 12. The powder removal plate 13 may be oriented in any of a following direction and a counter direction with respect to a direction of rotation of the flattening roller 12 to flatten the powder 20.

Figure 4:
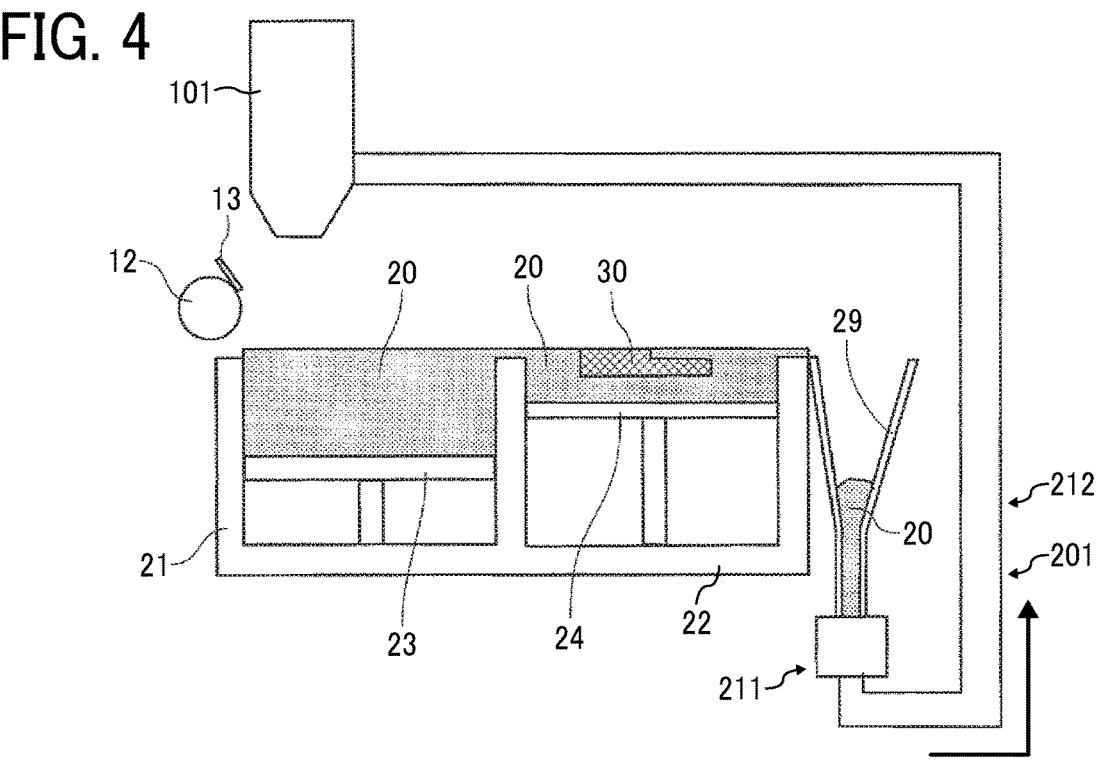
FIG. 4 is an illustration of a powder collector according to an embodiment of the present disclosure.
Figure 5:
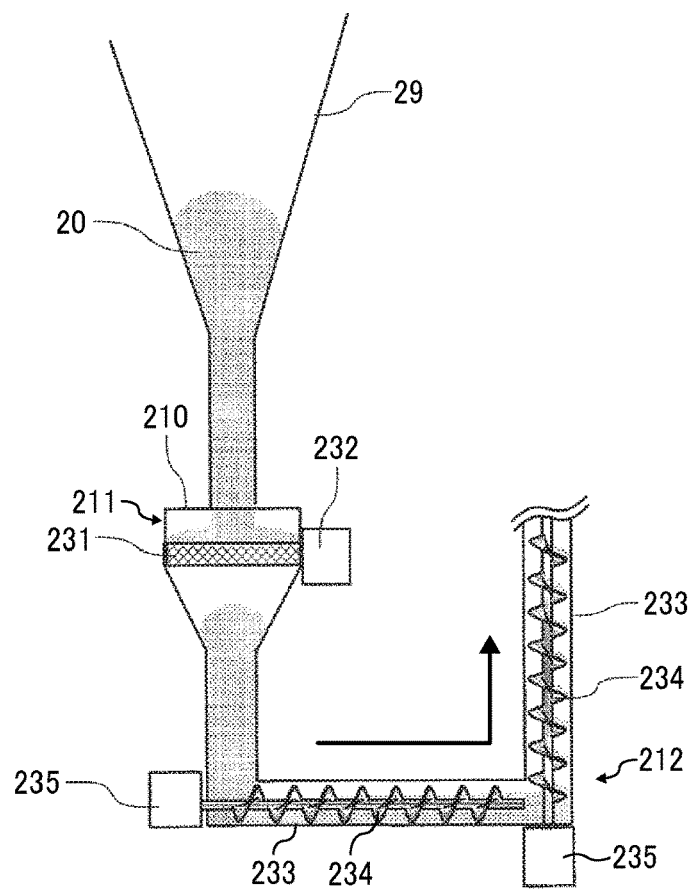
FIG. 5 is a schematic view of an example of a collection recycler of the powder collector.

Next, the powder collector is described with reference to FIGS. 4 and 5. FIG. 4 is a schematic view of the powder collector according to an embodiment of the present disclosure. FIG. 5 is a schematic view of an example of the collection recycler in the present embodiment.

The three-dimensional fabricating apparatus 601 includes the collection recycler 201 to collect the powder 20 discharged to the outside of the fabrication chamber 22 and restore the collected powder 20 to a usable state.

The collection recycler 201 includes a recycle processing unit 211 to perform processing to restore the powder 20, sent from the discharge port 29a of the surplus powder chamber 29, to the usable state. A transfer unit 212 transfers the powder, which has been restored to the usable state, to the powder supplier 101.

As illustrated in FIG. 5, the recycle processing unit 211 includes a filter 231 and a vibrator 232. The filter 231 filters the powder 20 into a vessel 210 to remove aggregated powder for classification. The vibrator 232 is disposed outside the vessel 210 to vibrate the entire vessel 210. By vibrating the entire vessel 210 with the vibrator 232, the recycle processing unit 211 classifies the powder 20 while crushing aggregated powder.

The transfer unit 212 includes a transfer passage 233, a plurality of screws 234, and a plurality of screw rotation motors 235. The transfer passage 233 transfers the powder 20, which having passed the recycle processing unit 211, to the powder supplier 101. The plurality of screws 234 transfers the powder 20. The plurality of screw rotation motors 235 drives and rotates the plurality of screws 234.

Figure 6:
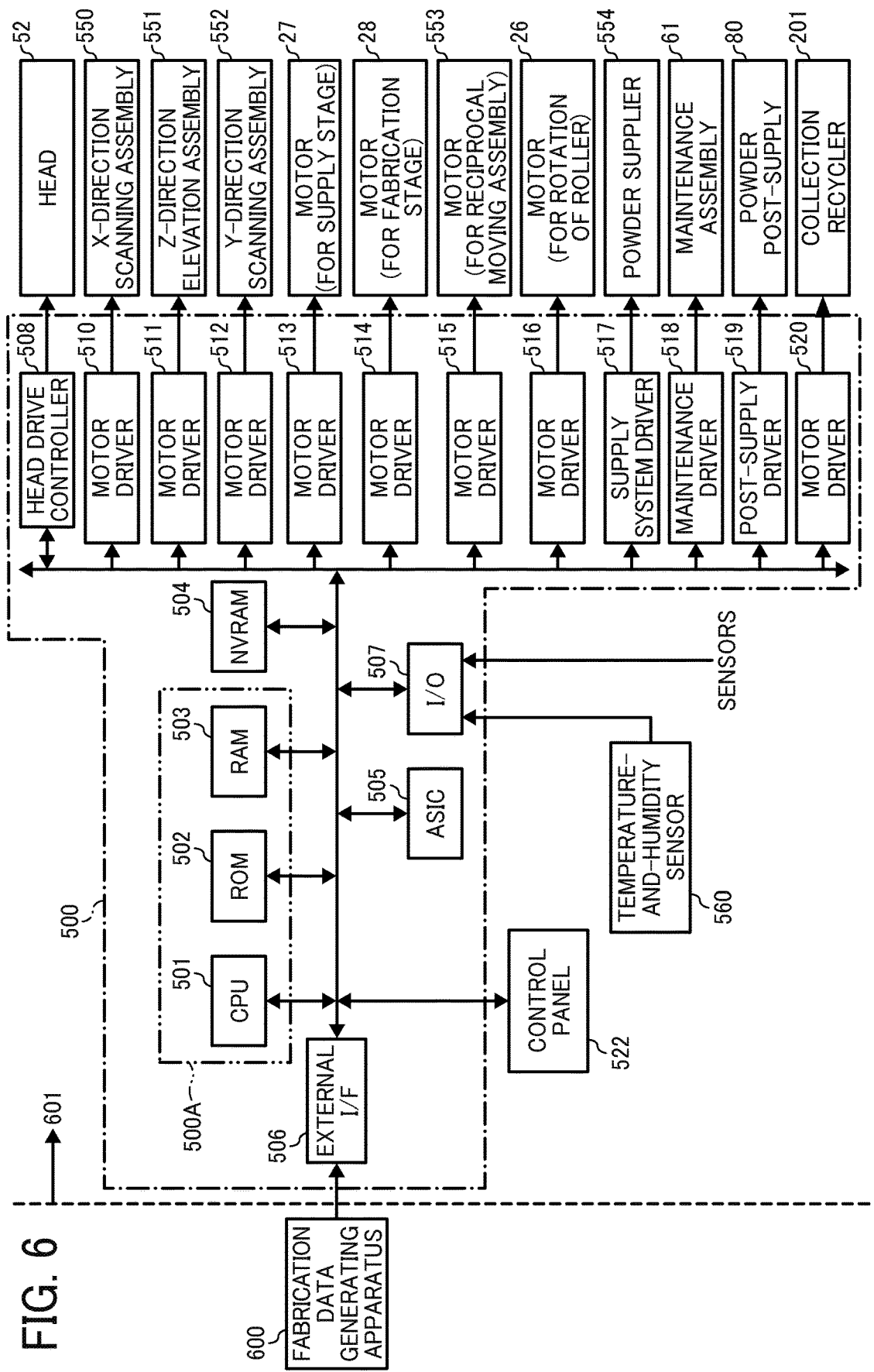
FIG. 6 is a block diagram of a controller of the three-dimensional fabricating apparatus according to an embodiment of the present disclosure.

Next, an outline of a controller of the three-dimensional fabricating apparatus is described with reference to FIG. 6. FIG. 6 is a block diagram of a controller of the three-dimensional fabricating apparatus according to an embodiment of the present disclosure.

A controller 500 as the controller includes a main controller 500A. The main controller 500A includes a central processing unit (CPU) 501, a read-only memory (ROM) 502, a random access memory (RAM) 503, a non-volatile random access memory (NVRAM) 504, and an application-specific integrated circuit (ASIC) 505. The CPU 501 manages the control of the entire three-dimensional fabricating apparatus 601. The ROM 502 stores programs executed by the CPU 501 and other fixed data. The programs stored in the ROM 502 include programs for causing the CPU 501 to execute control of three-dimensional fabricating operation which includes control according to embodiments of the present disclosure. The RAM 503 temporarily stores fabrication data and other data.

The NVRAM 504 retains data even when the apparatus is powered off. The ASIC 505 performs image processing, such as processing of various signals on image data, and processes input and output signals to control the entire apparatus.

The controller 500 also includes an interface (I/F) 506 to send and receive data and signals used in receiving fabrication data from an external fabrication data generating apparatus 600. The fabrication data generating apparatus 600 generates fabrication data in which a final-form object is sliced in multiple fabrication layers, and is constituted of an information processing apparatus, such as a personal computer.

The controller 500 includes an input-output (I/O) unit to receive detection signals of various sensors.

The controller 500 includes a head drive controller 508 to control driving of each head 52 of the liquid discharge unit 50.

The controller 500 includes a motor driver 510 and a motor driver 512. The motor driver 510 drives a motor constituting the X-direction scanning assembly 550 to move the carriage 51 of the liquid discharge unit 50 in the X direction (the main scanning direction). The motor driver 512 drives a motor constituting the Y-direction scanning assembly 552 to move the fabrication unit 5 in the Y direction (the sub-scanning direction).

The controller 500 includes a motor driver 511 to drive a motor constituting the Z-direction elevation assembly 551 to move (elevate) the carriage 51 of the liquid discharge unit 50 upward and downward in the Z direction. Note that the fabrication unit 5 may be elevated in the direction indicated by arrow Z.

The controller 500 includes a motor driver 513 and a motor driver 514. The motor driver 513 drives the motor 27 to elevate the supply stage 23 upward and downward. The motor driver 514 drives the motor 28 to elevate the fabrication stage 24 upward and downward.

The controller 500 includes a motor driver 515 and a motor driver 516. The motor driver 515 drives a motor 553 of the reciprocal moving assembly to move the flattening roller 12. The motor driver 516 includes the motor 26 to rotate the flattening roller 12.

The controller 500 includes a supply system driver 517 and a maintenance driver 518. The supply system driver 517 drives the powder supplier 101 to supply powder 20 to the supply chamber 21. The maintenance driver 518 drives the maintenance assembly 61 of the liquid discharge unit 50.

The controller 500 includes a post-supply driver 519 to cause a powder post-supply 80 to supply the powder 20.

The controller 500 includes a motor driver 520 to drive the motors 235 to rotate the plurality of screws 234 of the collection recycler 201.

The I/O unit 507 receives detection signals from, e.g., a temperature-and-humidity sensor 560 to detect temperature and humidity as environmental conditions of the apparatus and detection signals from other sensors.

The controller 500 is connected to a control panel 522 for inputting and displaying information necessary to the three-dimensional fabricating apparatus 601.

Note that the fabrication data generating apparatus 600 and the three-dimensional fabricating apparatus (powder lamination fabricating apparatus) 601 constitutes a fabrication system according to an embodiment of the present disclosure.

Next, a flow of fabrication steps is described with reference to FIGS. 7A through 7E. FIGS. 7A through 7E are schematic illustrations of the flow of fabrication steps.

First, a description is given of a state in which a first fabrication layer 30 is formed on the fabrication stage 24 of the fabrication chamber 22.

Figure 7A:
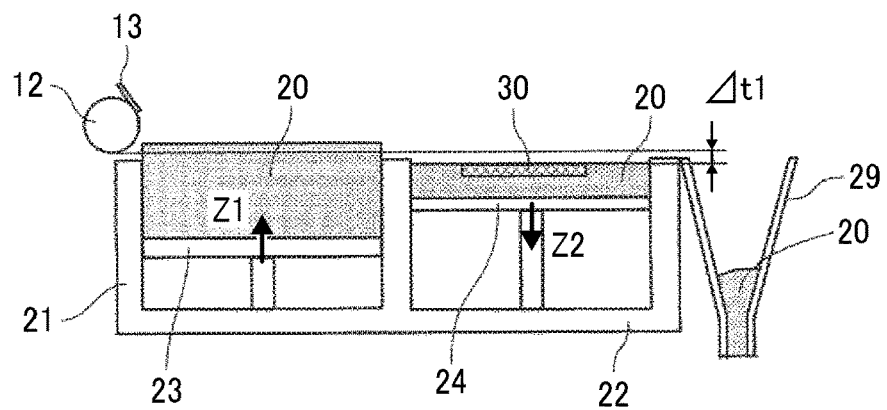
FIGS. 7A through 7E are schematic illustrations of a flow of fabrication steps.

When a second fabrication layer 30 is formed on the first fabrication layer 30, as illustrated in FIG. 7A, the supply stage 23 of the supply chamber 21 moves upward in a direction indicated by arrow Z1, and the fabrication stage 24 of the fabrication chamber 22 moves downward in a direction indicated by arrow Z2.

At this time, a downward movement distance of the fabrication stage 24 is set so that a distance between a surface of a powder layer 31 and a lower portion (lower tangential portion) of the flattening roller 12 is Δtl. The distance Δtl corresponds to the thickness (lamination pitch) of the powder layer 31 to be formed next. The distance Δtl is preferably about several tens μm to about 100 μm.

Figure 7B:
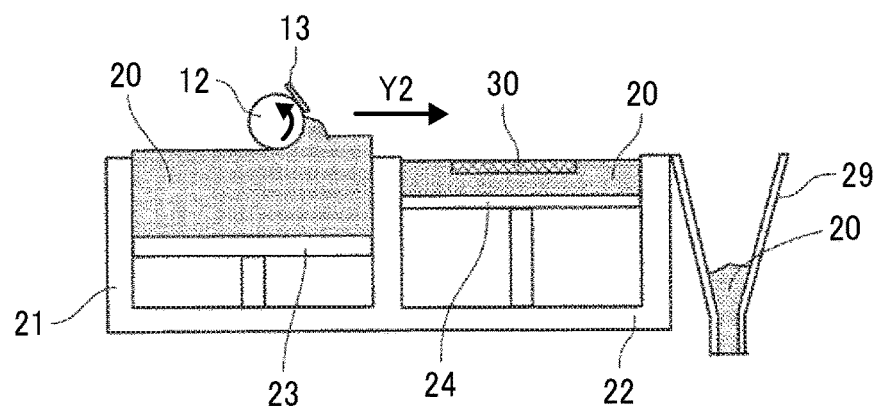

Next, as illustrated in FIG. 7B, by moving the flattening roller 12 in a direction indicated by arrow Y2 toward the fabrication chamber 22 while rotating the flattening roller 12 in a forward direction (indicated by arrow R), powder 20 upper than the level of a top face of the supply chamber 21 is transferred and supplied to the fabrication chamber 22 (powder supply).

Figure 7C:
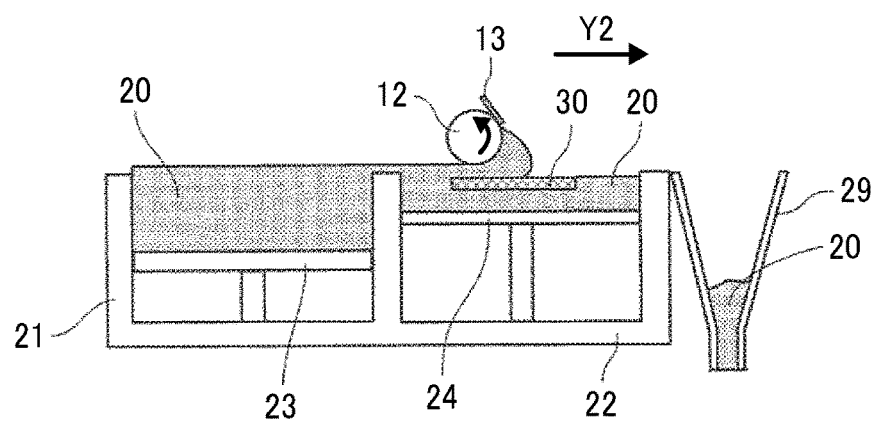

As illustrated in FIG. 7C, the flattening roller 12 is moved in parallel to the stage surface of the fabrication stage 24 of the fabrication chamber 22 to supply the powder 20 to the fabrication chamber 22 while evening the powder 20 (the term "flattening" means "supplying" and "evening").

Figure 7D:
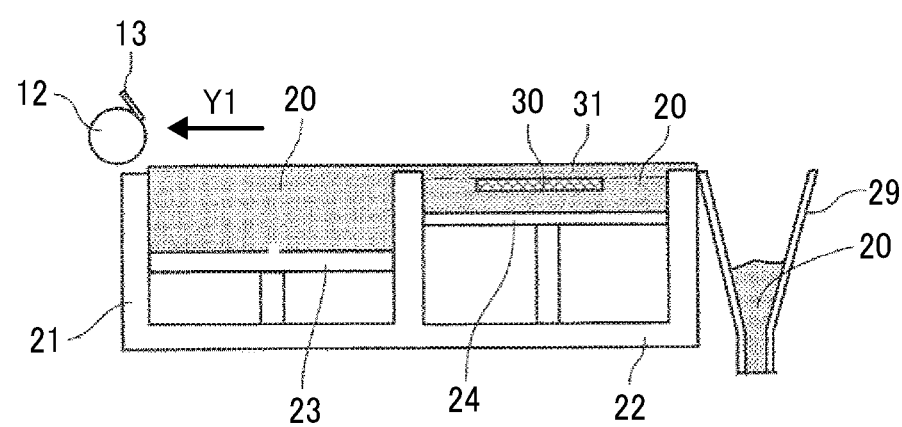

Thus, as illustrated in FIG. 7D, the powder layer 31 having a predetermined thickness Δtl is formed on the first fabrication layer 30 of the fabrication stage 24. At this time, the surplus powder 20, which has not been used for the formation of the powder layer 31, falls into the surplus powder chamber 29.

After the powder layer 31 is formed, as illustrated in FIG. 7D, the flattening roller 12 is moved in the direction indicated by arrow Y1 and returned to an initial position (original position).

Here, the flattening roller 12 is movable while maintaining a constant distance between the fabrication chamber 22 and the level of the top face of the supply chamber 21. Such a configuration allows formation of a uniform thickness Δtl of the powder layer 31 on the fabrication chamber 22 or the fabrication layer 30 already formed while transporting the powder 20 to an area above the fabrication chamber 22 with the flattening roller 12.

Figure 7E:
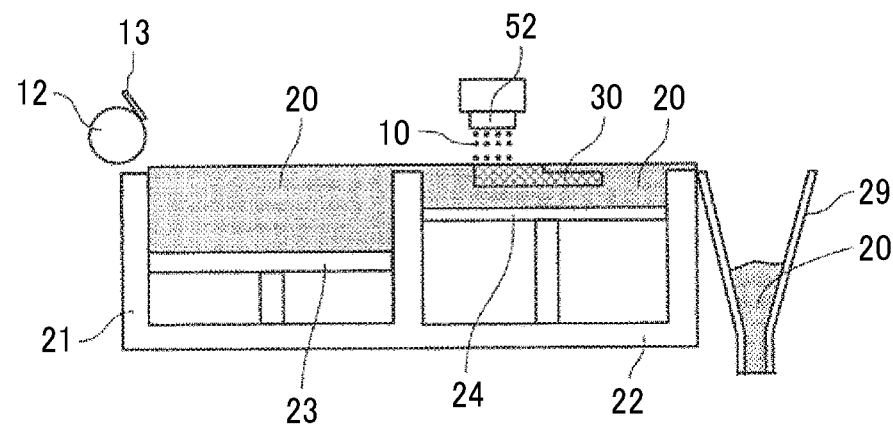

Then, as illustrated in FIG. 7E, droplets of fabrication liquid 10 are discharged from the heads 52 of the liquid discharge unit 50 to form and laminate the next fabrication layer 30 on the powder layer 31 (fabrication).

For the fabrication layer 30, for example, when the fabrication liquid 10 discharged from the heads 52 is mixed with the powder 20, adhesives contained in the powder 20 dissolve and bond together. Thus, particles of the powder 20 bind together to form the fabrication layer 30.

Next, the step of forming the powder layer 31 by the above-described powder supply and flattening and the step of discharging the fabrication liquid with the heads 52 are repeated to form a new fabrication layer 30. At this time, the newly-formed fabrication layer 30 and the preceding fabrication layer 30 are united to form part of a three-dimensional fabrication object.

Then, the step of forming the powder layer 31 by the powder supply and flattening and the step of discharging the fabrication liquid with the heads 52 are repeated a required number of times to finish the three-dimensional fabrication object (solid fabrication object).

Figure 8:
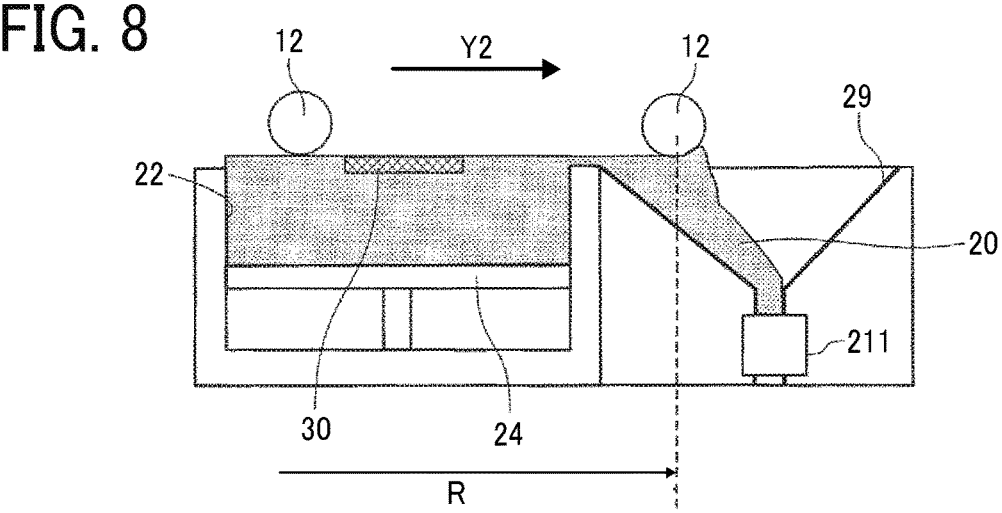
FIG. 8 is a schematic side view of a fabrication chamber and a surplus powder chamber in which surplus powder is unevenly accumulated.

Next, uneven accumulation of surplus powder in the surplus powder chamber in the surplus powder chamber is described with reference to FIG. 8. FIG. 8 is a schematic side view of the fabrication chamber 22 and the surplus powder chamber 29.

The flattening roller 12 forms the powder layer 31 in the fabrication chamber 22 and moves to the surplus powder chamber 29 to send the powder 20 into the surplus powder chamber 29. At this time, if the distance of movement of the flattening roller 12 in the flattening direction (Y2 direction) is increased to send surplus powder to a rear side of the surplus powder chamber 29 (an end of the surplus powder chamber 29 at a side opposite the fabrication chamber 22 in the flattening direction), uneven accumulation of the powder 20 in the surplus powder chamber 29 would be reduced.

However, if the distance of movement of the flattening roller 12 above the surplus powder chamber 29 is increased, the time for the flattening process (step) from the start to the end of formation of the single powder layer 31 would increase. The fabrication speed would decrease and the size of the three-dimensional fabricating apparatus would increase.

Hence, in the present embodiment, as illustrated in FIG. 8, the distance of movement of the flattening roller 12 in the Y2 direction above the surplus powder chamber 29 is set to be short and the movement of returning toward the original position is started at a predetermined position in an area at a side of the surplus powder chamber 29 closer to the fabrication chamber 22, to increase the fabrication speed and decrease the size of the three-dimensional fabricating apparatus.

However, for such a short distance of movement of the flattening roller 12, the powder 20 may adhere to a wall surface without reliably falling into the surplus powder chamber 29 and unevenly accumulate and heap along the wall surface at the side closer to the fabrication chamber 22.

As described above, if surplus powder heaps in the surplus powder chamber 29, the surplus powder may remain adhering to the flattening roller 12 and roughen the surface of the powder layer 31 having been flattened when the flattening roller 12 returns to the original position, thus reducing the accuracy of fabrication.

Figure 9:
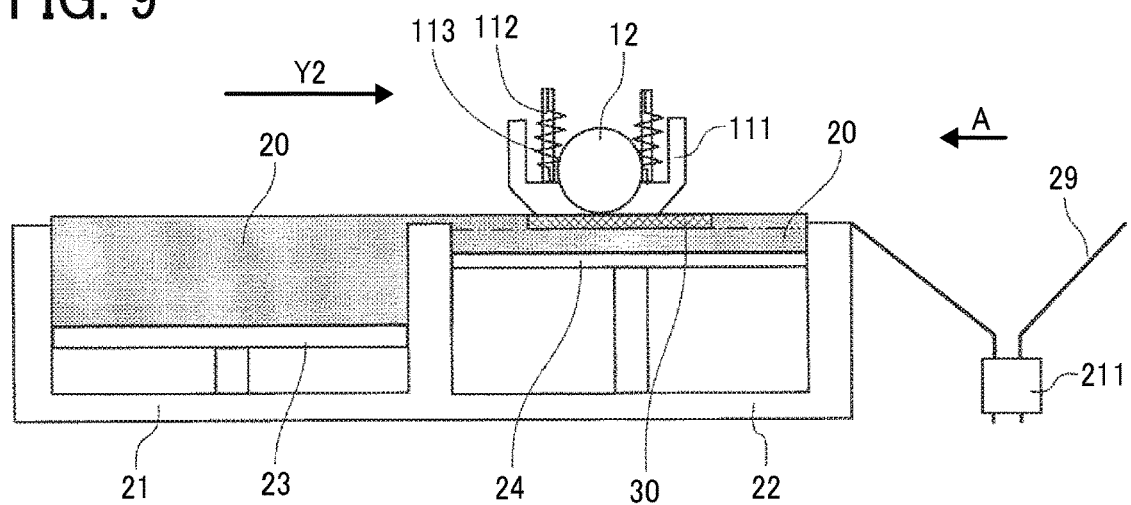
FIG. 9 is a side view of a powder leakage prevention unit around a flattening roller in a first embodiment of the present disclosure.
Figure 10:
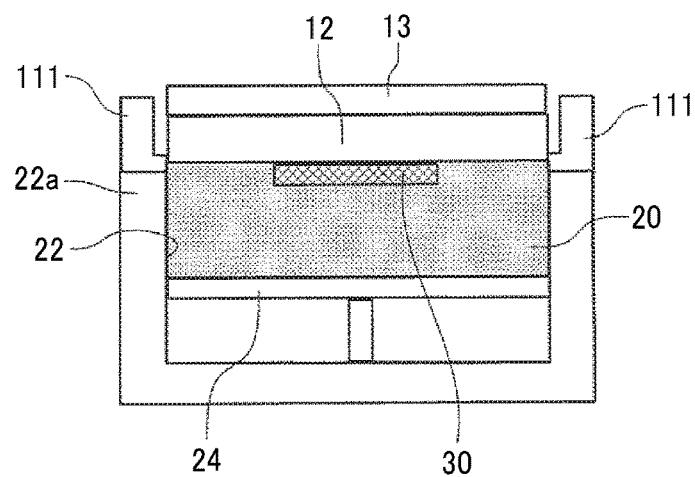
FIG. 10 is a front view of the powder leakage prevention unit, seen from a direction indicated by arrow A in FIG. 9.

Next, a powder leakage prevention unit around the flattening roller in a first embodiment of the present disclosure is described with reference to FIGS. 9 and 10. FIG. 9 is a side view of the powder leakage prevention unit. FIG. 10 is a front view of the powder leakage prevention unit, seen from a direction indicated by arrow A in FIG. 9.

Powder leakage stoppers 111 movable with the flattening roller 12 are disposed at both sides of the flattening roller 12 in the X direction (a direction perpendicular to the direction of movement of the flattening roller 12, in other words, a longitudinal direction of the flattening roller 12).

The powder leakage stoppers 111 prevent the powder 20 from leaking and falling to the outside of the fabrication chamber 22 when the powder 20 is transferred and supplied from the supply chamber 21 to the fabrication chamber 22.

The powder leakage stoppers 111 include pins 112 and springs 113 and move while contacting end surfaces of the flattening roller 12 in the X direction and upper surfaces of frame portions 22a of the fabrication chamber 22. Note that the powder leakage stoppers 111 also contact upper surfaces of frame portions of the supply chamber 21.

The pins 112 position the powder leakage stoppers 111 and the springs 113 press bottom surfaces of the powder leakage stoppers 111 against, e.g., the frame portions 22a of the fabrication chamber 22. The powder leakage stoppers 111 are preferably made of, e.g., resin to be smoothly slidable.

Figure 11:
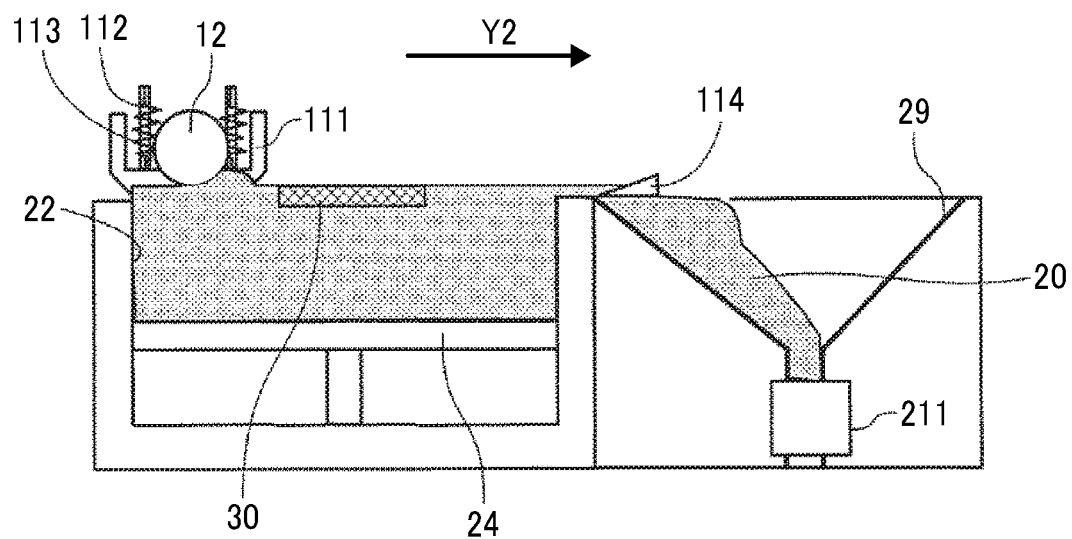
FIG. 11 is a schematic side view of the fabrication chamber and the surplus powder chamber in the first embodiment.

Next, a configuration of applying shock to the surplus powder chamber is described with reference to FIG. 11. FIG. 11 is a schematic side view of the fabrication chamber and the surplus powder chamber.

A chamber frame (frame portion) 29b of the surplus powder chamber 29 (see FIG. 1) includes a slant portion 114 that is slanted upward in one direction along the direction of movement of the flattening roller 12 for flattening (the flattening direction, in other words, the Y2 direction), at a position at which the powder leakage stopper 111 can pass. In the present embodiment, the slant portion 114 has a right triangle shape in side view.

The slant portion 114 of the surplus powder chamber 29 may be a single member molded with or a separate component from the frame portion 29b of the surplus powder chamber 29. For the separate component, the material of the slant portion 114 of the surplus powder chamber 29 may be the same as or different from the material of the surplus powder chamber 29. However, the material of the slant portion 114 of the surplus powder chamber 29 is preferably harder than the material of the surplus powder chamber 29 to prevent the slant portion 114 from being worn and decreasing in the effect of applying shock as the number of times of fabrication increases.

Figure 12A:
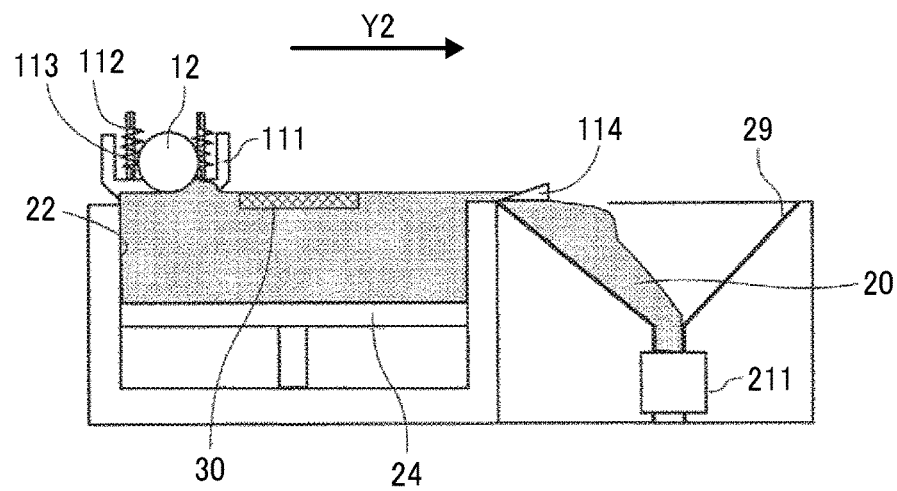
FIGS. 12A through 12C are schematic views of operation of the powder leakage prevention unit in the first embodiment.
Figure 12B:
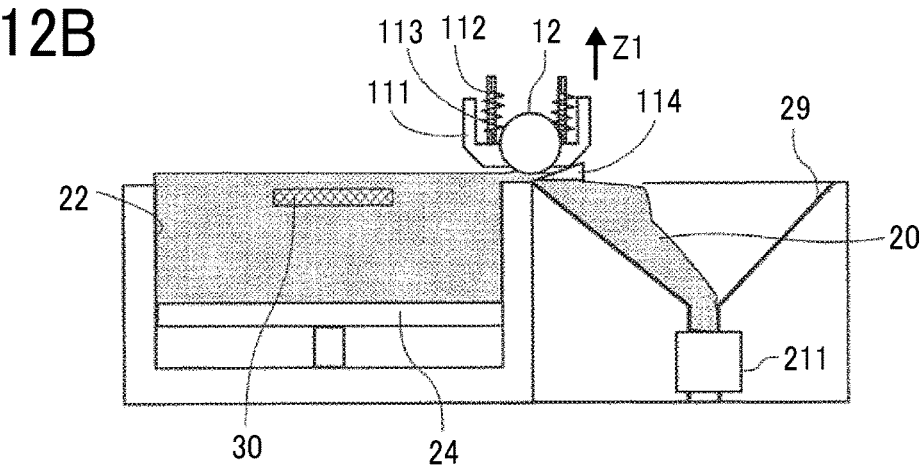
Figure 12C:
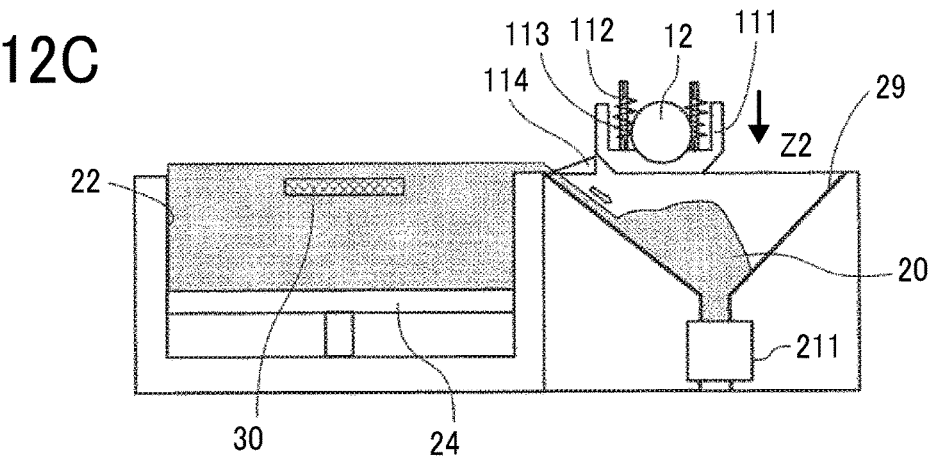

Next, the operation of the present embodiment is described with reference to FIGS. 12A through 12C. FIGS. 12A through 12C are schematic views of the operation in the present embodiment.

As illustrated in FIG. 12A, when the powder leakage stopper 111 moves with the flattening roller 12 in the flattening direction (the Y2 direction) to fill the fabrication chamber 22 with the powder 20 and flatten the powder 20 in the fabrication chamber 22, thus forming the powder layer 31.

As illustrated in FIG. 12B, when the powder leakage stopper 111 moves with the flattening roller 12 to the surplus powder chamber 29, the powder leakage stopper 111 runs onto the slant portion 114 and rises in the Z1 direction along a slant of the slant portion 114 with the movement in the Y2 direction.

Then, as illustrated in FIG. 12C, when the powder leakage stopper 111 passes out the slant portion 114, in other words, the powder leakage stopper 111 gets over the slant portion 114, the powder leakage stopper 111 falls on and bumps on the frame portion 29b of the surplus powder chamber 29.

At this time, the springs 113, which have contracted in the rising of the powder leakage stopper 111 in the Z1 direction along the slant of the slant portion 114, restore and bump on the frame portion 29b of the surplus powder chamber 29 with a greater impact.

The bumping of the powder leakage stopper 111 impacts on the frame portion 29b of the surplus powder chamber 29. Accordingly, the powder 20 adhering to the inner wall surface of the surplus powder chamber 29 and the powder 20 accumulated in the surplus powder chamber 29 are moved downward.

Such downward movement of the powder 20 reduces heaping of the powder 20 accumulated on the inner wall surface of the surplus powder chamber 29, even with the configuration in which the range of movement of the flattening roller 12 in the Y direction is shorter than the width of the surplus powder chamber 29.

Such a configuration can reduce the adhesion of powder to the flattening roller 12, thus ensuring the accuracy and productivity of fabrication and reducing the size of the three-dimensional fabricating apparatus.

By impacting on the surplus powder chamber 29, the powder 20 is tapped and the density of powder is increased. Accordingly, the occupied volume of the powder 20 is decreased, thus allowing a reduction of the size of the surplus powder chamber 29.

Figure 13A:
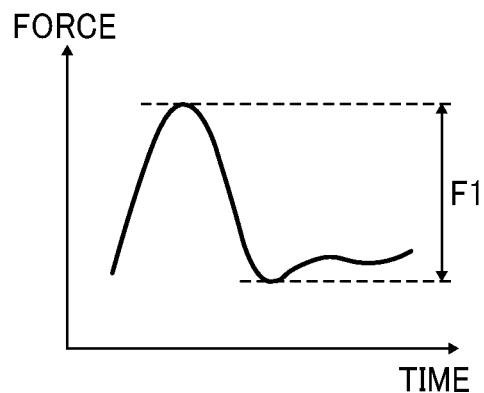
FIGS. 13A and 13B are illustrations of a difference between the configuration of the first embodiment and a configuration in which the surplus powder chamber is vibrated by a piezoelectric element.

Here, the difference between the above-described configuration and a configuration in which the surplus powder chamber 29 is vibrated by a piezoelectric element is described with reference to FIGS. 13A and 13B.

In the present embodiment, the powder leakage stopper 111 is mechanically bumped on the surplus powder chamber 29. Accordingly, for example, as illustrated in FIG. 13A, a great impact F1 is momentarily applied to the surplus powder chamber 29.

Figure 13B:
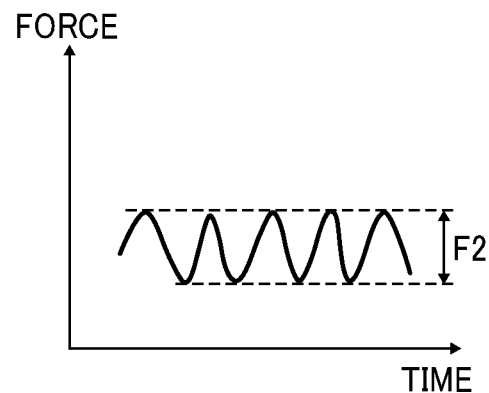

By contrast, for the configuration in which the piezoelectric element is used, as illustrated in FIG. 13B, periodical vibrating force F2 is applied to the surplus powder chamber 29 and a great impact as in according to the present embodiment is not obtained.

Accordingly, for example, even with a configuration in which powder, such as stainless steel (SUS), having a high specific gravity is used, applying the great impact as described above can effectively collapse the heaping of powder and efficiently collect and reuse the powder.

In the inner wall surface of the surplus powder chamber 29, processing of reducing the friction coefficient with the powder 20 (including the attachment of a separate member), e.g., mirror finishing is preferably performed on at least an inner wall surface at the side of the fabrication chamber 22.

For such a configuration, the powder 20 falls while sliding and rotating downward when the surplus powder chamber 29 is impacted, thus further enhancing the effect of dropping the powder by application of impact.

Figure 14:
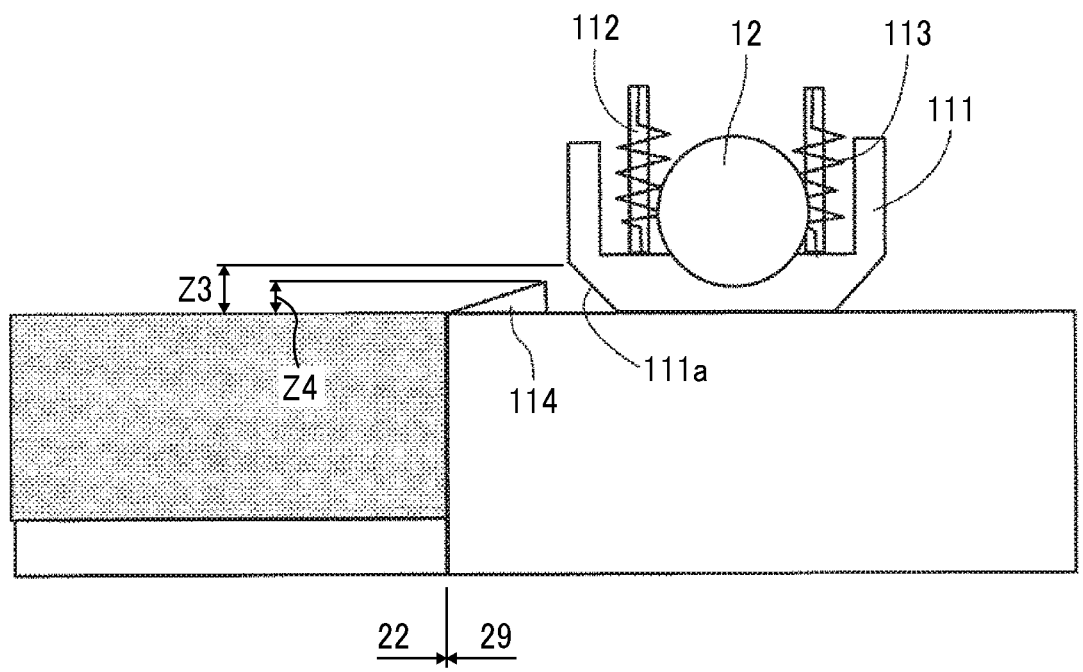
FIG. 14 is an illustration of a powder leakage stopper.

Next, the shape of the powder leakage stopper 111 is described with reference to FIG. 14. FIG. 14 is an illustration of the powder leakage stopper 111.

As described above, when the powder leakage stopper 111 passes the slant portion 114 and falls and bumps on the surplus powder chamber 29, thus impacting on the surplus powder chamber 29. Accordingly, the slant portion 114 has no slant on a downstream side of the flattening direction.

Hence, the powder leakage stopper 111 has a chamfered portion 111a to prevent the powder leakage stopper 111 from being hitched on the slant portion 114 when the powder leakage stopper 111 returns to the supply chamber 21. In such a case, the height Z3 of the chamfered portion 111a of the powder leakage stopper 111 is higher than the height Z4 of the slant portion 114 (Z3>Z4).

A start position of a slant of the slant portion 114 in the Y direction is preferably downstream from a boundary with the fabrication chamber 22. Such a configuration can reduce the positional deviation or damage of the fabrication layer 30 due to the impact on the fabrication layer 30 in the fabrication chamber 22, thus suppressing a reduction in accuracy of a three-dimensional object.

In the present embodiment, the powder leakage stopper 111 rises along the slant portion 114 on the surplus powder chamber 29 and falls on the surplus powder chamber 29 to impact on the surplus powder chamber 29. However, the configuration of impacting on the surplus powder chamber 29 is not limited to the above-described configuration. It is sufficient to impact on the surplus powder chamber 29 by falling with the movement of the flattening roller 12 for flattening. In some embodiments, for example, a slant portion may be provided separately from the surplus powder chamber 29 or a portion differing from the powder leakage stopper 111 may be received by a slant portion for rising.

In the present embodiment, the impact of the powder leakage stopper 111 on the surplus powder chamber 29 is determined by the springs 113 of the powder leakage stopper 111 and the height of the slant portion 114 of the surplus powder chamber 29.

For example, when fabrication is performed with powder of a low specific gravity, low impact is preferably applied.

When a great impact is applied to the powder of low specific gravity, the powder 20 might be raised in the surplus powder chamber 29. Consequently, the powder 20 might stains the interior of the three-dimensional fabricating apparatus and adhere to, e.g., the nozzles of the head 52 or the motor driver, thus reducing the accuracy of fabrication. Such a great impact might crack the fabrication layer 30 in the fabrication chamber 22.

By contrast, when fabrication is performed with powder of a great adhesion force, high impact is preferably applied since the adhesion force between powder particles is relatively great and likely to adhere to the wall surface of the surplus powder chamber 29.

A great impact is preferably applied according to the temperature and humidity environments in which the three-dimensional fabricating apparatus is placed, since powder particles are likely to aggregate together in, for example, a high-temperature and high-humidity environment.

Here, a series of fabrication steps including timing at which the surplus powder chamber is impacted is described with reference to FIG. 15.

Figure 15:
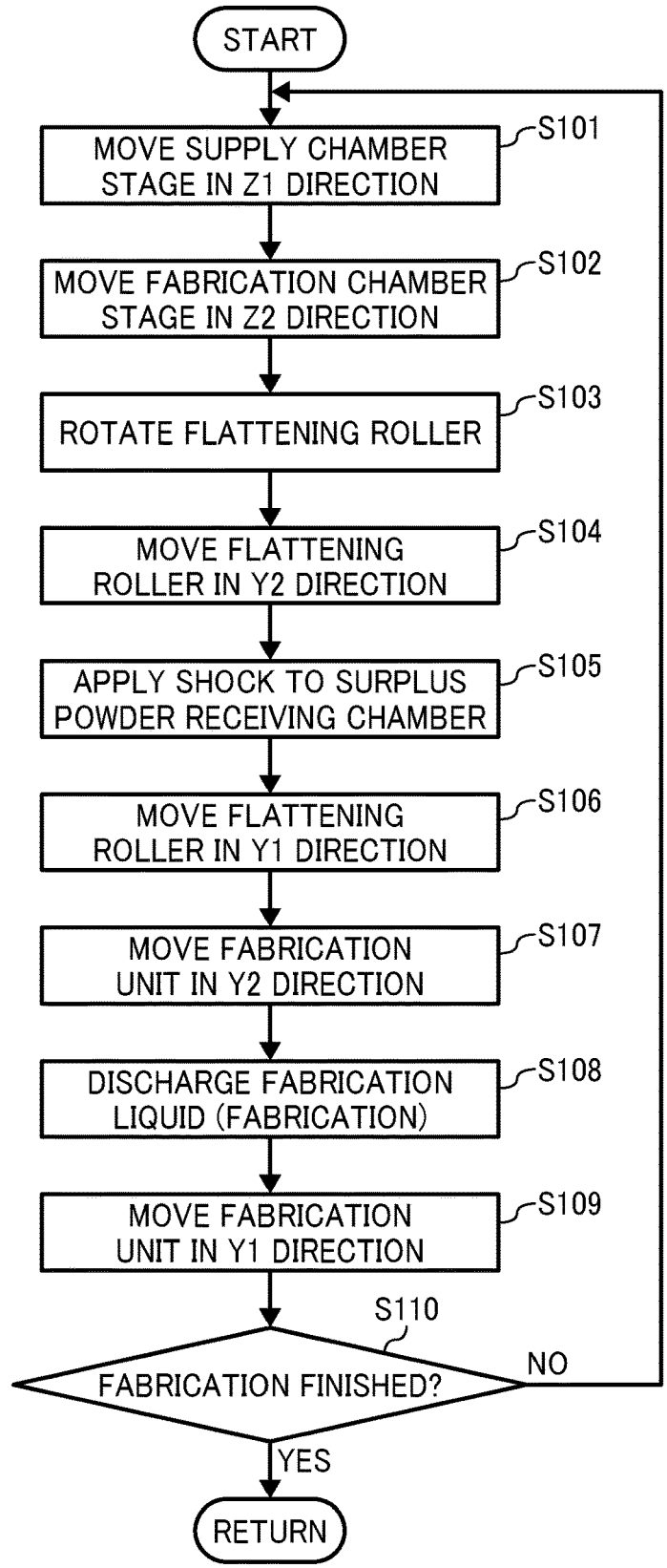
FIG. 15 is a flowchart of a series of fabrication steps including timing at which the surplus powder chamber is impacted.

In FIG. 15, at A101 the supply stage 23 of the supply chamber 21 moves in the Z1 direction and at S102 the fabrication stage 24 of the fabrication chamber 22 moves in the Z2 direction. The flattening roller 12 rotates (S103) and moves (S104) in the Y2 direction to transfer and supply the powder 20 from the supply chamber 21 side to the fabrication chamber 22 side. The flattening roller 12 flattens the powder 20 to form the powder layer 31 (first step).

The flattening roller 12 moves above the surplus powder chamber 29 to fall a surplus powder 20 into the surplus powder chamber 29 outside the fabrication chamber 22 (second step). At S105, the flattening roller 12 gets over the slant portion 114 of the powder leakage stopper 111 and impacts on the surplus powder chamber 29 (third step).

At S106, the flattening roller 12 moves in the Y1 direction to return to the original position.

At S107, the fabrication unit 5 moves in the Y1 direction. At S108, the head 52 discharges fabrication liquid to form the fabrication layer 30 in the powder layer 31 (fourth step). After the fabrication layer 30 is formed in the single powder layer 31, at S109 the fabrication unit 5 moves in the Y2 direction to return to the initial position.

At S110, the controller 500 determines whether the fabrication of a three-dimensional object has been finished. The above-described steps (S101 to S109) are repeated until the fabrication of the three-dimensional object has been finished (YES at S110).

The above-described process can reduce the heaping of the surplus powder of the surplus powder chamber 29. Accordingly, the range of movement of the flattening member can be shortened, thus enhancing the fabrication speed and allowing downsizing.

Figure 16:
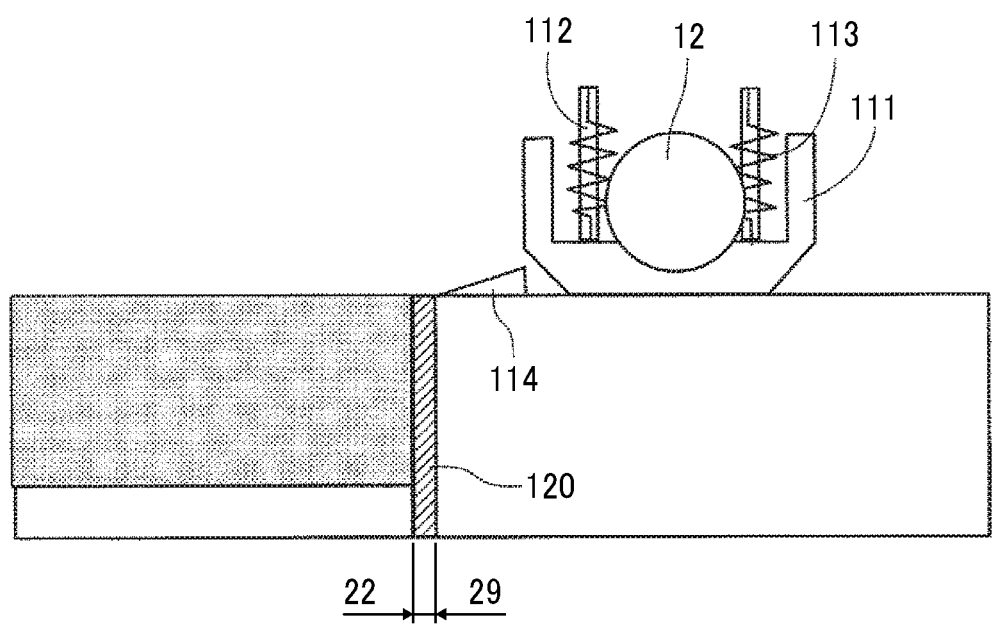
FIG. 16 is an illustration of the fabrication chamber and the surplus powder chamber in a second embodiment of the present disclosure.

Next, a second embodiment of the present disclosure is described with reference to FIG. 16. FIG. 16 is an illustration of the fabrication chamber and the surplus powder chamber in the second embodiment.

In the present embodiment, the frame portion 29b of the surplus powder chamber 29 and the frame portion 22a of the fabrication chamber 22 are separate components.

Such a configuration can prevent the impact applied to the surplus powder chamber 29 from being transmitted to the fabrication chamber 22, thus suppressing a reduction in accuracy of a fabrication object due to the positional deviation or damage of the fabrication layer 30.

In the present embodiment, a vibration absorber 120 is disposed between the frame portion 29b of the surplus powder chamber 29 and the frame portion 22a of the fabrication chamber 22.

Such a configuration can more reliably prevent the impact applied to the surplus powder chamber 29 from being transmitted to the fabrication chamber 22.

Figure 17A:
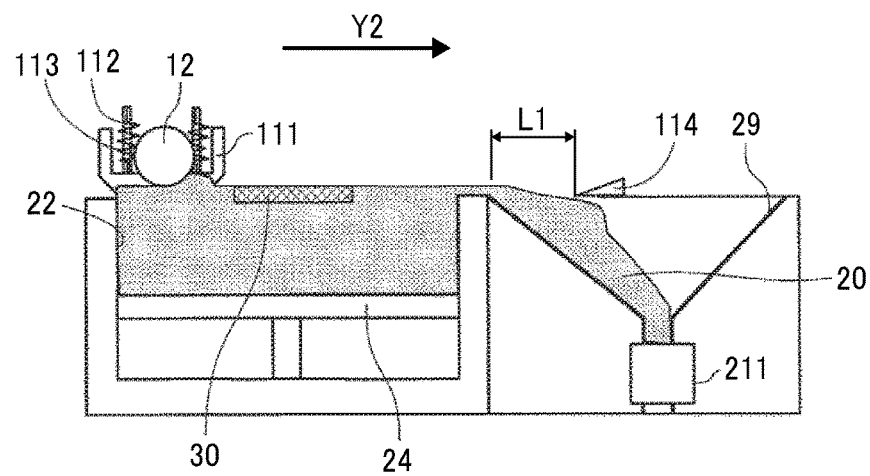
FIGS. 17A to 17C are illustrations of the fabrication chamber and the surplus powder chamber in a third embodiment of the present disclosure.
Figure 17B:
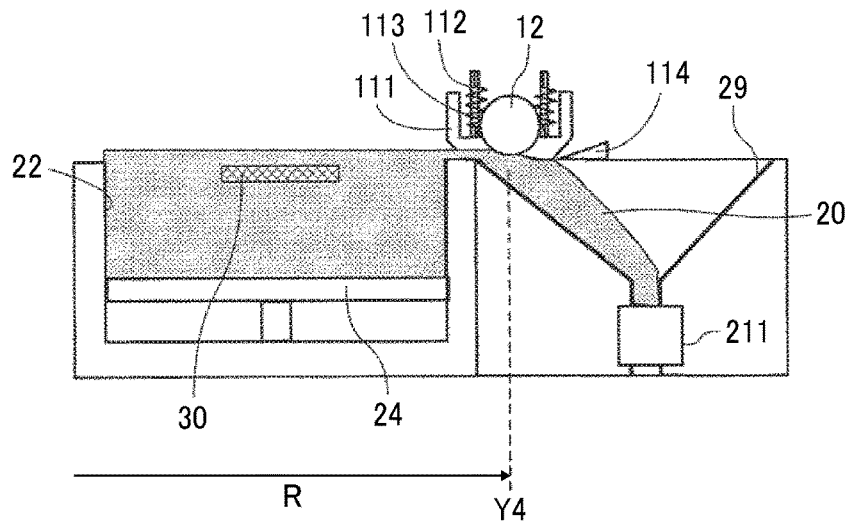
Figure 17C:
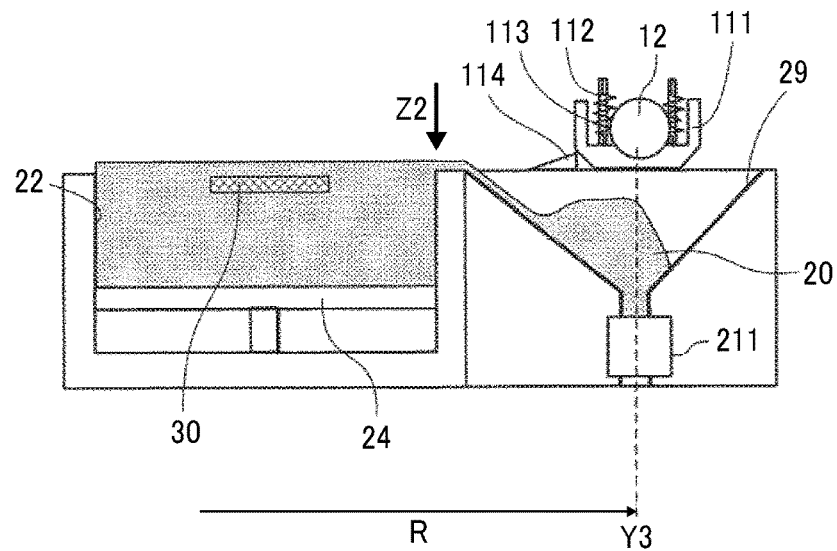

Next, a third embodiment of the present disclosure is described with reference to FIGS. 17A to 17C. FIGS. 17A to 17C are illustrations of the fabrication chamber and the surplus powder chamber in the third embodiment.

In the present embodiment, the slant portion 114 of the surplus powder chamber 29 is disposed at a position away from the fabrication chamber 22 of the surplus powder chamber 29 by a distance L1. An area (of the distance L1) in which the powder leakage stopper 111 does not run on the slant portion 114 is disposed between the slant portion 114 and the fabrication chamber 22.

The flattening roller 12 can opposed the surplus powder chamber 29 in the area of the distance L1.

In the present embodiment, a position Y3 and a position Y4 are set as return start position at which the flattening roller 12 starts returning to the original position, in other words, the movement end position at which the movement of the flattening roller 12 in the flattening direction ends. At the position Y3, as illustrated in FIG. 17C, the powder leakage stopper 111 gets over the slant portion 114 of the surplus powder chamber 29. At the position Y4, as illustrated in FIG. 17B, the powder leakage stopper 111 does not run on the slant portion 114 of the surplus powder chamber 29.

Figure 18:
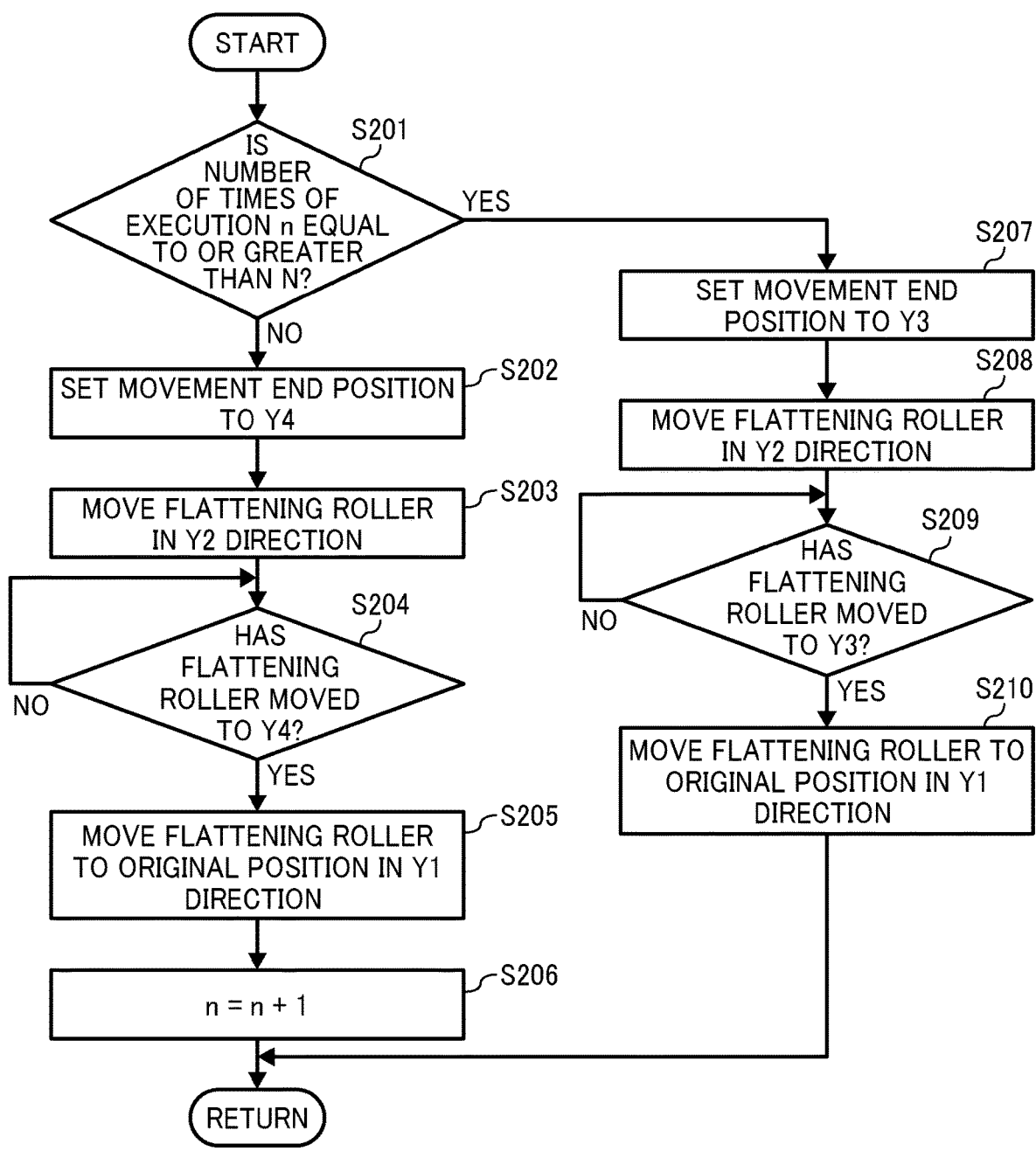
FIG. 18 is a flowchart of the control of movement of the flattening roller in the third embodiment.

Hence, the control of movement of the flattening roller in the present embodiment is described with reference to FIG. 18.

In flattening with the flattening roller 12, at S201, the controller 500 determines whether the number of times of execution n of the flattening process from the start of fabrication of a three-dimensional object (in other words, the number of times of formation of the fabrication layer 30 or the number of times of fabrication) is equal to or greater than N.

When the number of times of execution n of the flattening process is smaller than N (NO at S201), at S202 the controller 500 sets the movement end position in the flattening process to the position Y4 and at S203 moves the flattening roller 12 in the Y2 direction to from the powder layer 31 in the fabrication chamber 22.

As illustrated in FIG. 17B, when the flattening roller 12 has moved to the position Y4 (YES at S204), at S205 the flattening roller 12 moves in reverse in the Y1 direction to the original position.

At S206, the controller 500 increments the number of times of execution n.

When the number of times of execution n of the flattening process is equal to or greater than N (YES at S201), at S207 the controller 500 sets the movement end position in the flattening process to the position Y3 and at S208 moves the flattening roller 12 in the Y2 direction to from the powder layer 31 in the fabrication chamber 22.

As illustrated in FIG. 17C, when the flattening roller 12 has moved to the position Y3 (YES at S209), at S210 the flattening roller 12 moves in reverse in the Y1 direction to the original position.

Thus, until the number of times of fabrication (execution) n reaches the set number of times N, as illustrated in FIG. 17B, the flattening roller 12 moves in the area in which the powder leakage stopper 111 does not run on the slant portion 114 and starts returning to the original position.

When the number of times of fabrication (execution) n reaches the set number of times N, as illustrated in FIG. 17C, the flattening roller 12 moves to the position Y3 at which the powder leakage stopper 111 gets over the slant portion 114, and impacts on the surplus powder chamber 29 with the powder leakage stopper 111 to drop the powder 20.

As described above, the third step to impact on the surplus powder chamber 29 is not performed until the second step to drop the surplus powder into the surplus powder chamber 29 outside the fabrication chamber 22 is performed for a predetermined number of times.

In other words, in the initial period of fabrication, the amount of powder adhering to the wall surface of the surplus powder chamber 29 is small and does not heap over the frame portion 29b. Therefore, the range of movement of the flattening roller 12 is set in a range in which the flattening roller 12 does not run on the slant portion 114. Such a configuration can enhance the fabrication speed.

As the number of times of fabrication increases, the amount of powder adhering to the wall surface of the surplus powder chamber 29. Accordingly, the range of movement of the flattening roller 12 is set so that the flattening roller 12 moves to the position at which the flattening roller 12 gets over the slant portion 114. Such a configuration can reduce the heaping of the surplus powder.

Note that the set number of times N varies with the type and properties of powder and the temperature and humidity environments in which the three-dimensional fabricating apparatus is placed. The set number of times N is preferably set to a small value under conditions in which powder is likely to adhere to the wall surface of the surplus powder chamber 29, such as when the adhesion ratio of powder is high, when the specific gravity of powder is low, and when the three-dimensional fabricating apparatus is used in high-temperature and high-humidity environment.

Figure 19:
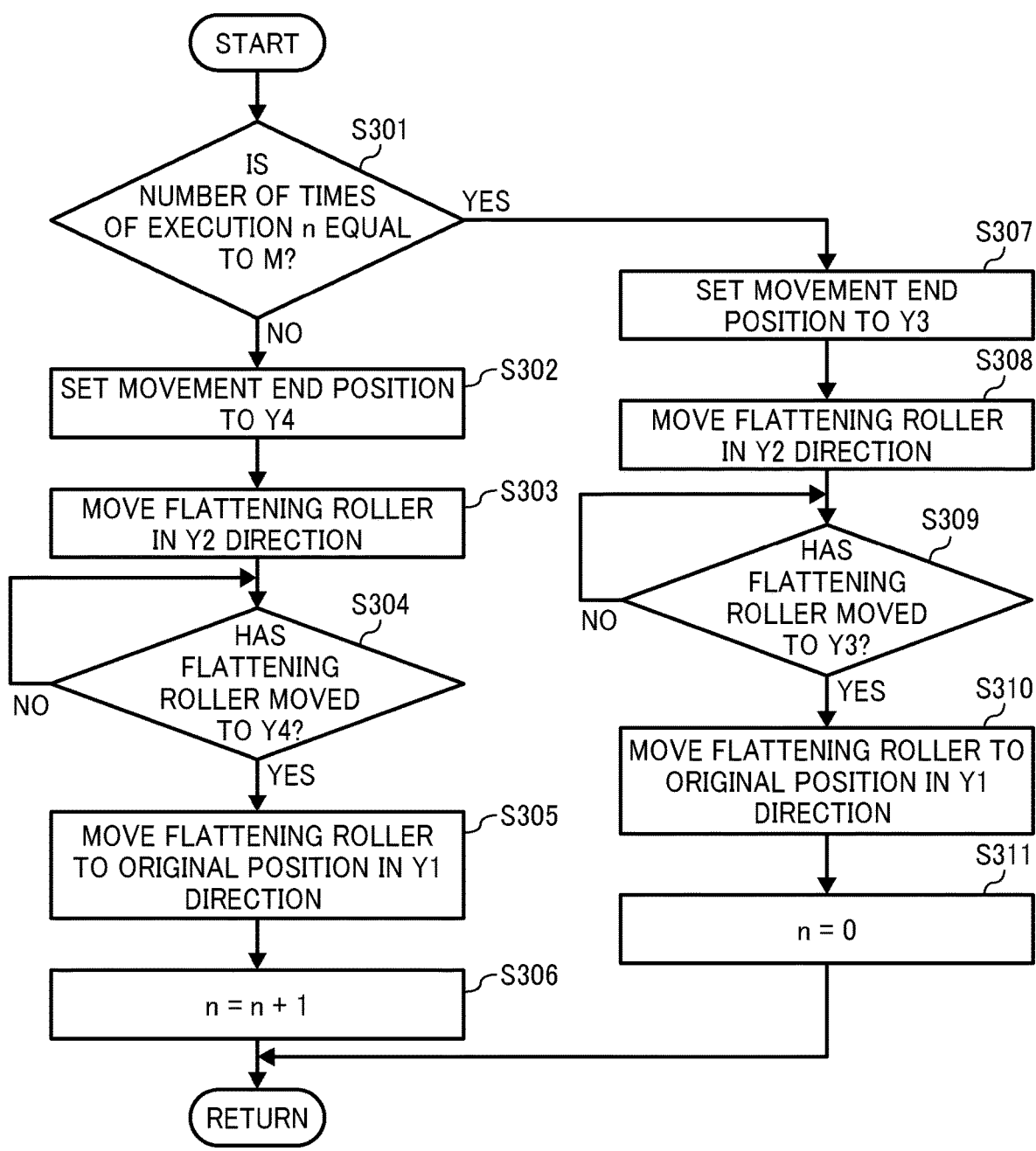
FIG. 19 is a flowchart of the control of movement of the flattening roller in a fourth embodiment of the present disclosure.

Next, a fourth embodiment of the present disclosure is described with reference to FIG. 19. FIG. 19 is a flowchart of the control of movement of the flattening roller in the present embodiment.

The position of the slant portion 114 is the same as in the above-described third embodiment. For the control of movement of the flattening roller in the present embodiment, normally, the flattening roller 12 is moved in the range of movement to the position Y4 to perform the flattening process and moved to the position Y3 every predetermined number of times M.

In other words, in flattening with the flattening roller 12, at S301, the controller 500 determines whether the number of times of execution n of the flattening process (in other words, the number of times of formation of the fabrication layer 30 or the number of times of fabrication) is M.

When the number of times of execution n of the flattening process is not M (NO at S301), at S302 the controller 500 sets the movement end position in the flattening process to the position Y4 and at S303 moves the flattening roller 12 in the Y2 direction to from the powder layer 31 in the fabrication chamber 22.

As illustrated in FIG. 17B, when the flattening roller 12 has moved to the position Y4 (YES at S304), at S305 the flattening roller 12 moves in reverse in the Y1 direction to the original position.

At S306, the controller 500 increments the number of times of execution n.

When the number of times of execution n of the flattening process is M (YES at S301), at S307 the controller 500 sets the movement end position in the flattening process to the position Y3 and at S308 moves the flattening roller 12 in the Y2 direction to from the powder layer 31 in the fabrication chamber 22.

As illustrated in FIG. 17C, when the flattening roller 12 has moved to the position Y3 (YES at S309), at S310 the flattening roller 12 moves in reverse in the Y1 direction to the original position.

At S311, the controller 500 rests the number of times of execution n to zero.

Thus, while the number of times of fabrication (execution) n is not the predetermined number of times M, as illustrated in FIG. 17B, the flattening roller 12 moves in the area in which the powder leakage stopper 111 does not run on the slant portion 114 and starts returning to the original position.

When the number of times of fabrication (execution) n reaches the predetermined number of times M, as illustrated in FIG. 17C, the flattening roller 12 moves to the position Y3 at which the powder leakage stopper 111 gets over the slant portion 114, and impacts on the surplus powder chamber 29 with the powder leakage stopper 111 to drop the powder 20.

As described above, after the third step to impact on the surplus powder chamber 29 is performed, the next round of the third step is performed until the second step to drop the surplus powder 20 into the surplus powder chamber 29 outside the fabrication chamber 22 is performed for a predetermined number of times.

In other words, once impact is applied to the surplus powder chamber 29, the flattening process is performed the predetermined number of times M before a surplus powder heaps again. Hence, the flattening roller 12 is moved to the position Y3 every predetermined number of times M to impact on the surplus powder chamber 29 to reduce the heap of the surplus powder. Until the heap of the surplus powder rises again, the flattening process is performed with the movement to the position Y4.

Such a configuration can enhance the fabrication speed.

Note that the predetermined number of times M varies with the type and properties of powder and the temperature and humidity environments in which the three-dimensional fabricating apparatus is placed. The predetermined number of times M is preferably set to a small value under conditions in which powder is likely to adhere to the wall surface of the surplus powder chamber 29, such as when the adhesion ratio of powder is high, when the specific gravity of powder is low, and when the three-dimensional fabricating apparatus is used in high-temperature and high-humidity environment.

Figure 20:
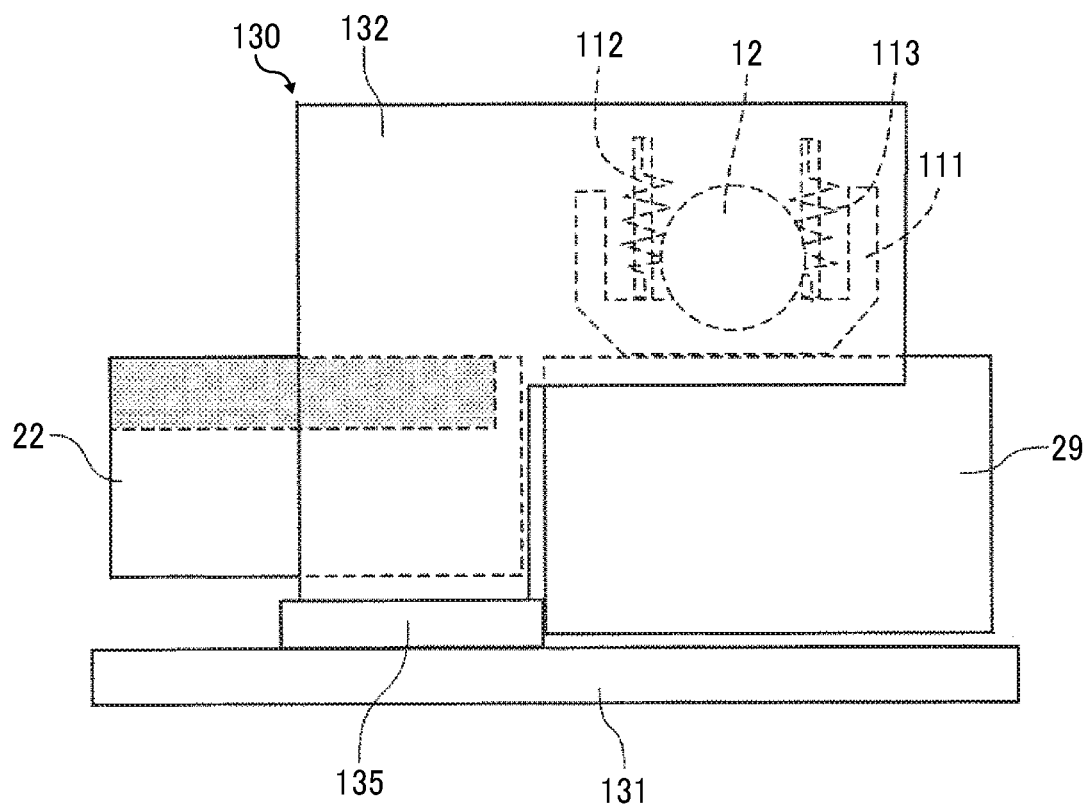
FIG. 20 is an illustration of a fifth embodiment of the present disclosure.

Next, a fifth embodiment of the present disclosure is described with reference to FIG. 20. FIG. 20 is an illustration of the fifth embodiment of the present disclosure.

In the present embodiment, the three-dimensional fabricating apparatus includes a flattening roller unit 130 to hold, e.g., the flattening roller 12 and the powder leakage stopper 111 and move in the Y direction. The flattening roller unit 130 is movable along a guide rail 131 extending in the Y direction.

At side plates 132 of the flattening roller unit 130 are disposed impact applicators 135 to bump on an outer face of the frame portion 29b of the surplus powder chamber 29 to impact on the surplus powder chamber 29.

Such a configuration can impact on the surplus powder chamber 29 with movement of the flattening roller unit 130 and reduce the heap of surplus powder in the surplus powder chamber 29. Therefore, additional components can be obviated, thus reducing the cost of components.

In such a case, the control of movement of the flattening roller can be performed similarly with the above-described third or fourth embodiment, thus allowing enhancement of the fabrication speed.

In other words, the movement end position of the flattening roller unit 130 is set to a position in which the flattening roller 12 opposes the surplus powder chamber 29 and the impact applicators 135 does not contact the surplus powder chamber 29.

Similarly with the above-described third embodiment, the flattening roller 12 moves in the area in which the impact applicator 135 does not contact the surplus powder chamber 29, until the number of times of execution n of the flattening process reaches the set number of times N. When the number of times of execution n of the flattening process is equal to or greater than the set number of times N, the flattening roller 12 moves to the position at which the impact applicator 135 contacts the surplus powder chamber 29.

Alternatively, similarly with the above-described fourth embodiment, the flattening roller 12 is moved to the position at which the impact applicator 135 contacts the surplus powder chamber 29, every predetermined number of times M.

Such a configuration can enhance the fabrication speed.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A three-dimensional fabricating apparatus, comprising:
   a fabrication chamber to stack powder in layers and a layered fabrication object in which the powder is bonded together;
   a flattening member to relatively move with respect to the fabrication chamber to fill the fabrication chamber with the powder;
   a surplus powder chamber disposed outside the fabrication chamber, to receive a surplus of the powder having not been filled in the fabrication chamber;
   a powder leakage stopper disposed at a side of the flattening member in a longitudinal direction of the flattening member perpendicular to a direction of movement of the flattening member; and
   a slant portion to raise the powder leakage stopper with horizontal movement of the flattening member,
   wherein, after the powder leakage stopper gets over the slant portion, the powder leakage stopper falls off an end of the slant portion to impact a frame portion of the surplus powder chamber.

2. The three-dimensional fabricating apparatus according to claim 1, further comprising:
   an impact applicator horizontally movable with the flattening member to impact on an outer frame of the surplus powder chamber.

3. The three-dimensional fabricating apparatus according to claim 1,
   wherein the slant portion is disposed on the frame portion of the surplus powder chamber.

4. The three-dimensional fabricating apparatus according to claim 1, further comprising:

a plurality of powder leakage stoppers disposed at each side of the flattening member in the longitudinal direction of the flattening member, wherein the slant portion is disposed on the frame portion of the surplus powder chamber at a position at which the powder leakage stopper passes.

5. The three-dimensional fabricating apparatus according to claim 1, wherein the slant portion is disposed away from the fabrication chamber via an area in which the powder leakage stopper does not run on the slant portion and the flattening member opposes the surplus powder chamber, and wherein the flattening member moves to a position at which the powder leakage stopper gets over the slant portion, every time a number of times of flattening with the flattening member reaches a predetermined number of times.

6. The three-dimensional fabricating apparatus according to claim 1, wherein the slant portion is disposed away from the fabrication chamber via an area in which the powder leakage stopper does not run on the slant portion and the flattening member opposes the surplus powder chamber, and wherein the flattening member is movable up to the area while a number of times of flattening with the flattening member is smaller than a set number of times.

7. The three-dimensional fabricating apparatus according to claim 1, wherein a frame portion of the fabrication chamber is a separate member from the frame portion of the surplus powder chamber.

8. The three-dimensional fabricating apparatus according to claim 7, further comprising:

a vibration absorber disposed between the frame portion of the fabrication chamber and the frame portion of the surplus powder chamber.

9. The three-dimensional fabricating apparatus according to claim 1, wherein an inner wall surface of the surplus powder chamber is processed to reduce a friction coefficient with the powder.

10. The three-dimensional fabricating apparatus according to claim 1, wherein the flattening member is a roller.

* * * * *